US008851476B2

(12) United States Patent
Pabon

(10) Patent No.: US 8,851,476 B2
(45) Date of Patent: Oct. 7, 2014

(54) STRATEGY GAME

(71) Applicant: Javier Pabon, New York, NY (US)

(72) Inventor: Javier Pabon, New York, NY (US)

(73) Assignee: Tructo, LLC, New York, NY (US)

( * ) Notice: Subject to any disclaimer, the term of this patent is extended or adjusted under 35 U.S.C. 154(b) by 0 days.

(21) Appl. No.: 13/874,047

(22) Filed: Apr. 30, 2013

(65) Prior Publication Data

US 2013/0234390 A1 Sep. 12, 2013

Related U.S. Application Data

(63) Continuation-in-part of application No. 13/039,637, filed on Mar. 3, 2011.

(60) Provisional application No. 61/653,043, filed on May 30, 2012.

(51) Int. Cl.
*A63F 9/10* (2006.01)

(52) U.S. Cl.
USPC ........................................ 273/236; 273/153 R

(58) Field of Classification Search
USPC ...... 273/153 R, 156, 157 R; 446/85; 434/171
See application file for complete search history.

(56) References Cited

U.S. PATENT DOCUMENTS

| | | | | |
|---|---|---|---|---|
| 2,481,109 | A * | 9/1949 | Grace | 434/333 |
| 3,368,816 | A | 2/1968 | Milazzo et al. | 273/134 |
| 3,923,307 | A | 12/1975 | Sukys et al. | 273/157 R |
| 4,052,072 | A * | 10/1977 | Beal | 273/254 |
| 4,085,938 | A * | 4/1978 | Bean, Jr. | 273/279 |
| 4,361,328 | A | 11/1982 | Stein et al. | 273/156 |
| 4,375,288 | A | 3/1983 | Guertin | 273/273 |
| 4,463,952 | A | 8/1984 | Rowbal | 273/236 |

(Continued)

FOREIGN PATENT DOCUMENTS

| | | |
|---|---|---|
| CA | 2 305 127 A1 | 10/2001 |
| GB | 10653 | 5/1911 |
| KR | 1020050107412 A | 11/2005 |
| WO | WO 03/103786 A1 | 12/2003 |

OTHER PUBLICATIONS

Int'l Search Report and Written Opinion of the Int'l Searching Authority, PCT/US2012/026288, May 31, 2012.

(Continued)

*Primary Examiner* — Vishu K. Mendiratta
(74) *Attorney, Agent, or Firm* — Fitzpatrick, Cella, Harper & Scinto

(57) ABSTRACT

A game set and method for playing a strategy game on a playing surface by one or more persons including a plurality of playing pieces, each playing piece having a predetermined number of edges, wherein each edge is at least one of an exterior edge and a connecting edge; a plurality of playing cards, each playing card containing an indicia corresponding to the shape of one of the plurality of playing pieces; and a playing surface. Each player randomly selects a plurality of playing cards; exchanges each of the playing cards for a corresponding one of a plurality of playing pieces, and places each playing piece obtained by the exchange on a playing surface by (i) orienting an exterior edge according to a perimeter of the playing surface and (ii) orienting a connecting edge according to a corresponding connecting edge of an adjacent playing piece. The strategy game may be played in various configurations, including without playing cards, without playing pieces, without a game board, or with a timer.

10 Claims, 6 Drawing Sheets

(56) References Cited

U.S. PATENT DOCUMENTS

| | | | | |
|---|---|---|---|---|
| 4,640,512 A | * | 2/1987 | Burke | 273/157 R |
| 4,643,429 A | | 2/1987 | Crandon et al. | 273/251 |
| 4,669,734 A | | 6/1987 | Watkins | 273/157 |
| 4,792,138 A | | 12/1988 | Watkins | 273/157 |
| 4,867,455 A | | 9/1989 | Fritzman | 273/156 |
| 5,009,430 A | * | 4/1991 | Yuhasz | 273/255 |
| 5,022,655 A | | 6/1991 | Meyer | 273/157 |
| 5,062,637 A | | 11/1991 | Bianchi | 273/157 |
| 5,141,235 A | * | 8/1992 | Hernandez | 273/308 |
| D332,288 S | | 1/1993 | Murphy, Sr. | D21/25 |
| 5,288,076 A | | 2/1994 | Jackson et al. | 273/279 |
| 5,301,953 A | | 4/1994 | Levin | 273/276 |
| 5,344,147 A | | 9/1994 | Lee | 273/153 |
| 5,692,749 A | | 12/1997 | Vogeler | 273/157 |
| 5,752,701 A | | 5/1998 | Kao | 273/269 |
| 5,957,454 A | | 9/1999 | Libeskind | 273/157 |
| 5,979,895 A | * | 11/1999 | Dove | 273/157 R |
| 6,193,234 B1 | | 2/2001 | Jones | 273/157 |
| 6,702,586 B1 | * | 3/2004 | Miller | 434/406 |
| 6,708,973 B1 | | 3/2004 | Hall, Jr. et al. | 273/157 |
| 2003/0127795 A1 | * | 7/2003 | Chambers | 273/157 R |
| 2005/0200076 A1 | * | 9/2005 | Wu | 273/157 R |
| 2005/0230912 A1 | | 10/2005 | Kirkwood | 273/134 |
| 2010/0276885 A1 | | 11/2010 | Buff | 275/292 |
| 2011/0031689 A1 | * | 2/2011 | Binder | 273/157 R |

OTHER PUBLICATIONS

*Ex Parte* Laura Montocchio, U.S. Appl. No. 11/091,314, Appeal No. 2009-011763, Mar. 18, 2011.

Int'l Search Report and Written Opinion of the Int'Searching Authority, PCT/US2013/038866, Aug. 22, 2013.

\* cited by examiner

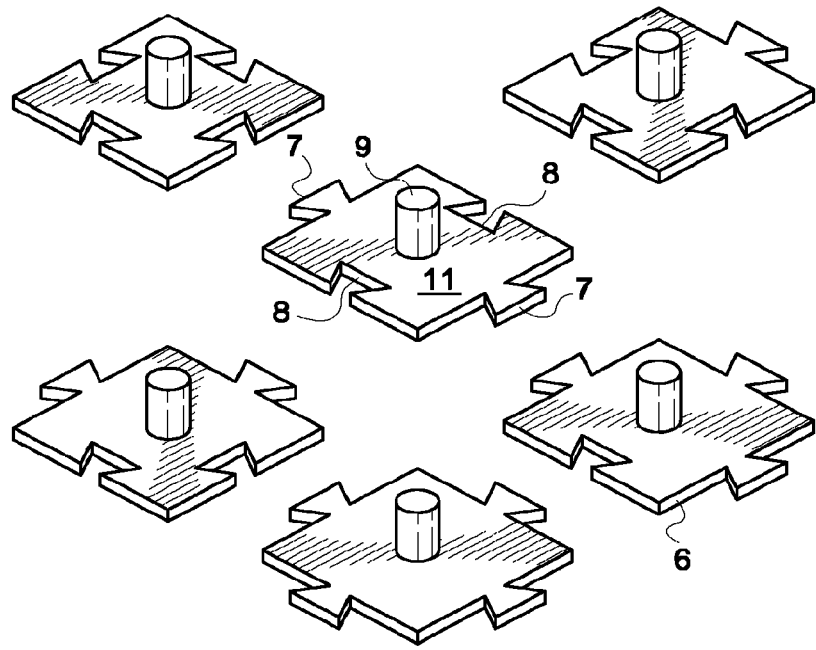
FIG. 4
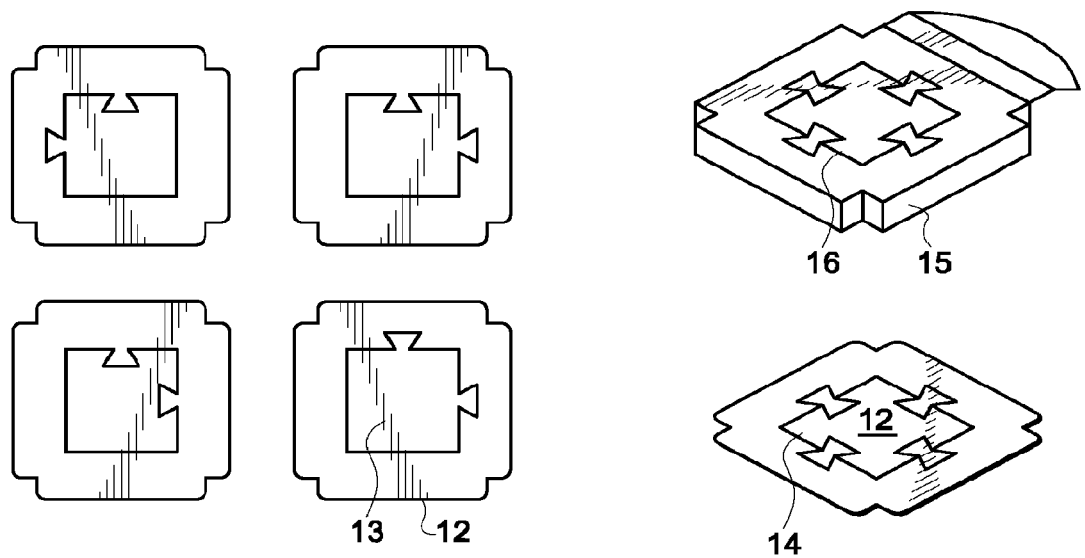
FIG. 5
FIG. 6

TOP VIEW OF THE TRAYS

3D VIEW OF TRAY

The Grid Sections

Interior section – white
Border section – light gray
Corner section – dark gray

Interior Drawings. 6 of each.

Border Drawings. 3 of each.

Corner Drawings. 1 of each.

STRATEGY GAME

CROSS-REFERENCE TO RELATED APPLICATIONS

The present application is a continuation-in-part (CIP) of U.S. patent application Ser. No. 13/039,637, filed on Mar. 3, 2011, and claims benefit of priority under 35 U.S.C. §119(e) to U.S. Provisional Patent Application No. 61/653,043, filed on May 30, 2012. The entire contents of each of the above-referenced patent applications are hereby incorporated by reference.

BACKGROUND

I. Field

The present invention pertains to the field of games and in particular to strategy games.

II. Related Art

There are a number of games which integrate the construction of a puzzle and a board game together. Typical jigsaw puzzles, for example, have pieces which can be assembled over particular indicia of a game board. Points can be assigned based on covering or connecting certain areas of the game board, and by playing a uniquely shaped piece of the puzzle in a particular manner. Such puzzles, however, have a predetermined position within the puzzle, where a player can place a playing piece, and thus, having only one solution.

There are other games which allow construction of separate puzzles for each player. In such games, the players compete with each other. However, these games do not allow the players to play in direct competition with each other, whereby a players' moves affect the other player's ability to utilize his/her turn.

BRIEF DESCRIPTION

Games can be fun, challenging, and a way to teach children of all ages about logic and strategic thinking. The embodiments described herein meet the above-identified needs by providing: a) a strategy game having multiple solutions; b) a strategy game which can be played alone, competitively, or cooperatively; c) a strategy game that can be played together with or without playing cards: d) a strategy game which can be played in a variety of mediums, including as a traditional game with physical components or on an electronic platform.

One example aspect provides a game set for playing a strategy game on a playing surface by one or more persons. The game set includes (a) a plurality of playing pieces, each playing piece having a predetermined number of edges, wherein each edge is at least one of an exterior edge and a connecting edge, (b) a plurality of playing cards, each playing card containing an indicia corresponding to the shape of one of the plurality of playing pieces, and (c) a playing surface.

Another example aspect provides a strategy game played by one or more players. Each player randomly selects a plurality of playing cards, each playing card containing an indicia corresponding to the shape of one of the plurality of playing pieces. Each player exchanges each of the playing cards for a corresponding one of a plurality of playing pieces, each playing piece having a predetermined number of edges, wherein each edge is either one of an exterior edge or a connecting edge. Each player places each playing piece obtained by said exchanging on a playing surface by (i) orienting an exterior edge according to a perimeter of the playing surface and (ii) orienting a connecting edge according to a corresponding connecting edge of an adjacent playing piece.

Still another aspect provides playing a strategy game by one or more players. Each player randomly selects a plurality of playing cards, each playing card containing an indicia of a shape having a predetermined number of edges, wherein each edge is at least one of an exterior edge and a connecting edge. Each player places each playing card on a playing surface by (i) orienting the indicia of an exterior edge according to a perimeter of the playing surface and (ii) orienting the indicia of a connecting edge according to a corresponding connecting edge of an adjacent playing piece.

According to other example aspects, each player is dealt an equal amount of playing cards to begin each of a plurality of sets, and an amount of turns for each player in each set is limited to a predetermined number. In another example aspect, one or more playing pieces or playing cards are already on the playing surface at the beginning of the game. Still another example aspect provides a storage tray for storing the playing pieces. The storage tray includes cavities respectively corresponding to different types of shapes of the playing pieces.

Yet another example aspect provides playing a strategy game by one or more players. Each player randomly selects a plurality of predefined drawings, each predefined drawing corresponding to a shape having a predetermined number of edges, wherein each edge is at least one of an exterior edge and a connecting edge. Each player draws one or more of the predefined drawings on a playing surface by (i) orienting the indicia of an exterior edge according to a perimeter of the playing surface and (ii) orienting the indicia of a connecting edge according to a corresponding connecting edge of an adjacent predefined drawing.

Further features and advantages, as well as the structure and operation, of various example embodiments of the present invention are described in detail below with reference to the accompanying drawings.

BRIEF DESCRIPTION OF THE DRAWINGS

The features and advantages of the example embodiments of the invention presented herein will become more apparent from the detailed description set forth below when taken in conjunction with the following drawings.

FIG. 4 illustrates interior playing pieces according to one embodiment of the invention.

FIG. 5 illustrates a bottom plan view of a playing card including an indicia on its lower surface according to one embodiment of the invention.

FIG. 6 illustrates a top plan view of a playing card including a logo on its upper surface, and a box for the playing cards according to one embodiment of the invention.

DETAILED DESCRIPTION

Figure 1:
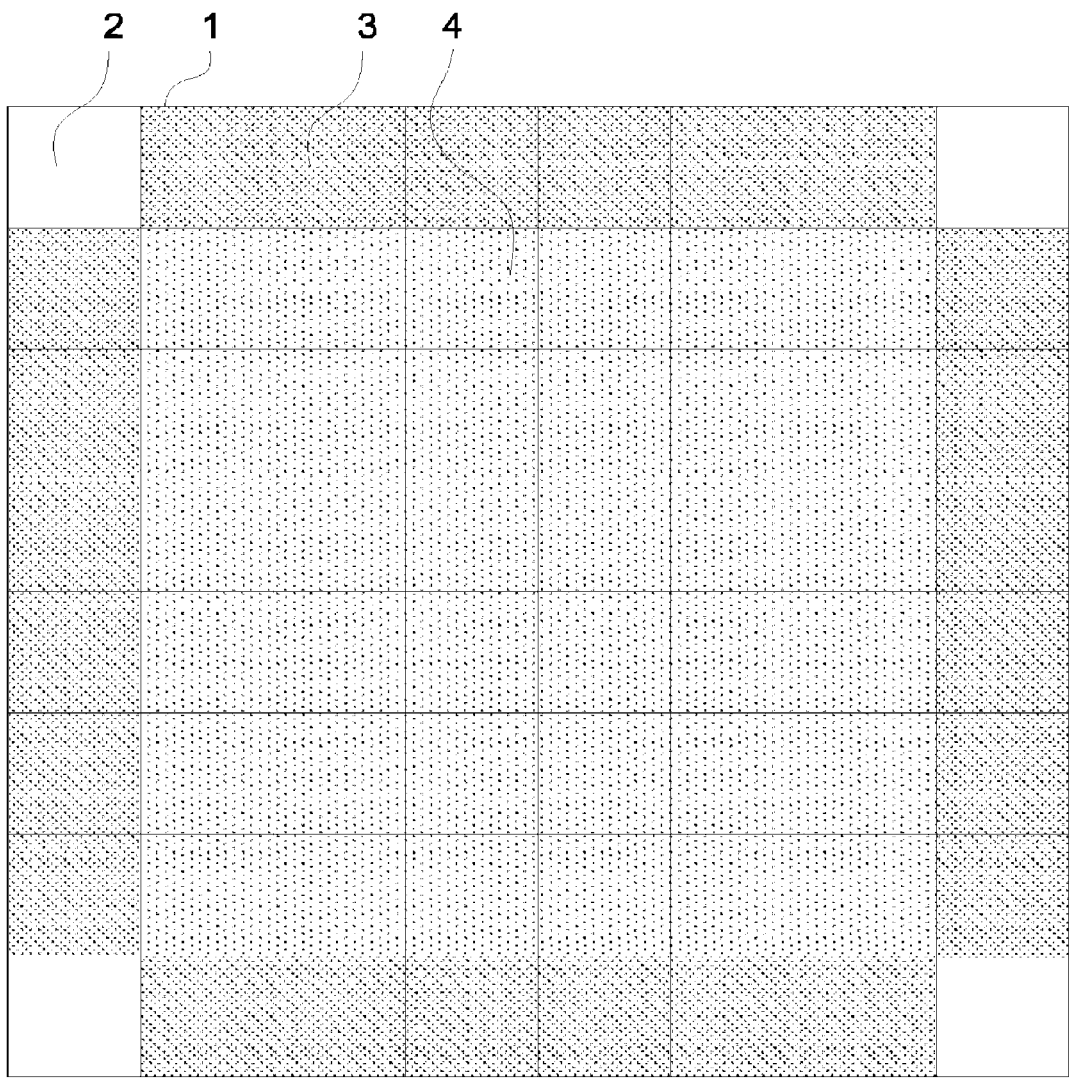
FIG. 1 illustrates a plan view of a game board according to one embodiment of the invention.

FIG. 1 illustrates a plan view of a game board 100 according to one embodiment of the invention. As shown in FIG. 1, the playing surface 1 of game board 100 is a grid containing sixty-four square shaped spaces. In one embodiment, playing surface 1 contains different types of spaces. For example, playing surface 1 may include corner spaces 2, border spaces 3 and interior spaces 4. In this exemplary embodiment, there are four corner spaces 2, twenty-four border spaces 3, and thirty-six interior spaces 4.

Playing surface 1 provides a surface on which the playing pieces are placed during game play. Any flat material can be used to form playing surface 1 by carving out, drawing, or otherwise delineating the shaped spaces which form the surface.

Other shape spaces which facilitate placement of the playing pieces on the playing surface 1 can be used instead of the square shaped spaces (e.g., triangular, rectangular, pentagonal, hexagonal, octagonal, etc.).

Each type of space on the playing surface 1, corner space 2, border space 3, and interior space 4, contain different indicia, indicating correct placement of a playing piece during game play.

Figure 2:
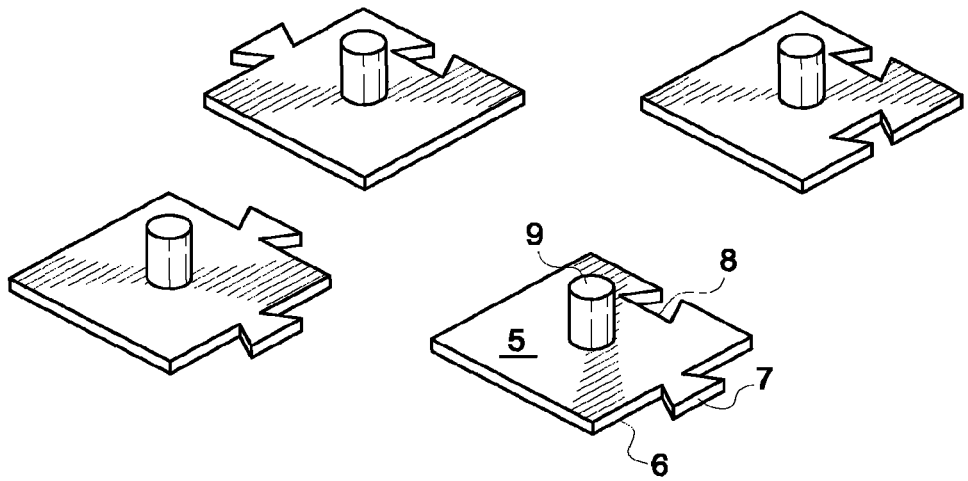
FIG. 2 illustrates corner playing pieces according to one embodiment of the invention.
Figure 3:
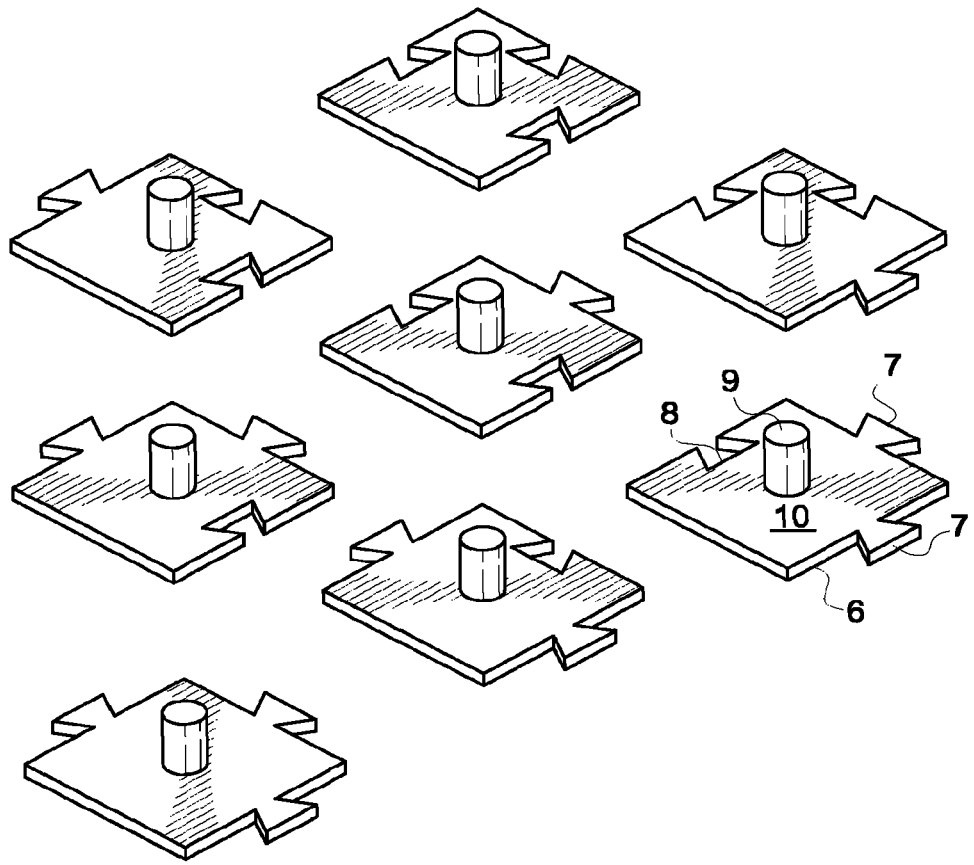
FIG. 3 illustrates border playing pieces according to one embodiment of the invention.

FIGS. 2, 3 and 4 illustrate corner playing pieces 5, border playing pieces 10 and interior playing pieces 11 according to one exemplary embodiment. As shown in FIGS. 2, 3, and 4, each corner playing piece 5, border playing piece 10, and interior playing piece 11 contain four edges 6. Each edge 6 is an exterior edge or a connecting edge. The connecting edge can be a male connector 7 or a female connector 8. The male connector 7 is a protrusion of an edge 6. The female connector 8 is an indentation of an edge 6. Alternatively, each edge 6 may have a combination of both male and female connectors. A male connector 7 and a female connector 8 can be of any shape or design that matches the edge 6 of one playing piece 5, 10 and 11 with the corresponding edge of another playing piece 5, 10 and 11. In another embodiment, the connecting edge can be an edge matching system. The edge matching system is an indicia drawn, etched, or otherwise printed on the surface of the edge 6 of the playing piece 5, 10 and 11. In one embodiment, the indicia is a color. In another embodiment, the indicia is a design.

Two adjacent edges 6 of the corner playing pieces 5 contain a connecting edge, and two adjacent edges 6 are exterior edges. In the exemplary embodiment, there are four different combinations of connecting edges and exterior edges 6 for the corner playing piece 5.

Three adjacent edges 6 of the border playing pieces 10 contain a connecting edge, and one edge 6 is an exterior edge. In the exemplary embodiment, there are eight different combinations of connecting edges and exterior edges 6 for the border playing piece 10. There are three duplicates of each of the eight different border playing pieces 10

Four edges 6 of the interior playing pieces 11 contain a connecting edge. In an exemplary embodiment, there are six different combinations of connecting edges 6. There are six duplicates of each of the six different interior playing pieces 11.

Referring again to FIGS. 2, 3, and 4, eighteen different playing pieces, each playing piece containing a different combination of four edges: four corner playing pieces 5, eight border playing pieces 10, and six interior playing pieces 11, are shown. In the exemplary embodiment of the invention, there are a total of sixty-four playing pieces, including four corner playing pieces 5, twenty-four border playing pieces 10, and thirty-six interior playing pieces 11. A handle 9 for lifting the playing pieces 5, 10, and 11 protrudes upward from the center of playing pieces 5, 10, and 11. In one exemplary embodiment the handle 9 is a cylindrical column. The handle 9 may be any design that provides aid to a player to lift the playing pieces 5, 10, and 11.

As shown in FIG. 5, the lower surface of a playing card 12 contains an indicia 13 corresponding to the design of the corner playing piece 5, the border playing piece 10, or the interior playing piece 11. There is one playing card 12 corresponding to each of the playing pieces 5, 10 and 11. Playing cards 12 determine the order in which the playing pieces 5, 10 and 11 are placed on the playing surface 1, or indicate which playing pieces 5, 10 and 11 are available to place on the playing surface 1. In the exemplary embodiment, there are sixty-four playing cards 12: four playing cards 12 corresponding to the corner playing pieces 5; three duplicates of each of eight playing cards corresponding to the border playing pieces 10; and six duplicates of each of six playing cards corresponding to the interior playing pieces 11.

As shown in FIG. 6, the upper surface of the playing card 12 contains an indicia 14 drawn on the upper surface of the playing card 12. A box 15 provides storage for the playing cards 12. The box is constructed of any suitable material, including but not limited to paper, plastic, or cardboard. The surface of the box 15 contains an indicia 16 drawn on the surface of the box.

Figure 7:
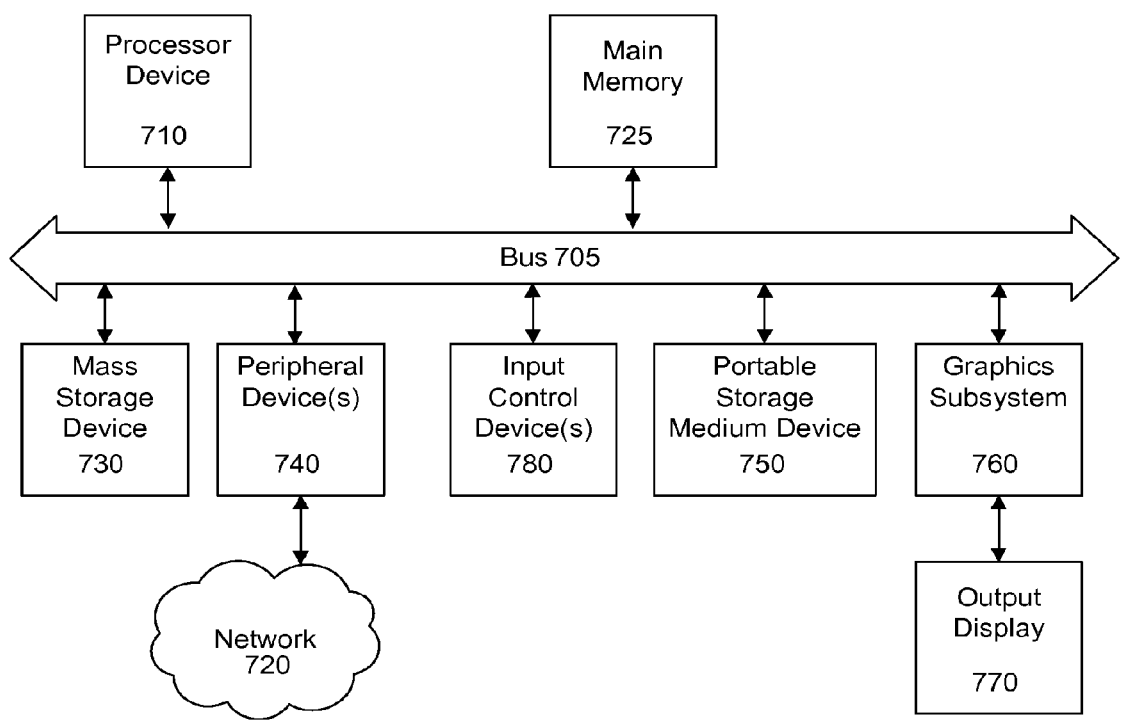
FIG. 7 is a block diagram of a general and/or special purpose computer, in accordance with some embodiments.

FIG. 7 is a high-level block diagram of a general and/or special purpose computer 700, in accordance with some embodiments. The computer 700 may be, for example, a user device, a user computer, a client computer and/or a server computer, among other things.

Exemplary Embodiments of Game Play

A game for connecting individually or cooperatively all the playing pieces 5, 10 and 11 is provided. A player wins the game if he/she is the first player to connect all the playing pieces 5, 10 and 11 corresponding to all his/her playing cards 12 or accumulates the least amount of points.

Generally, the type and method of game play is determined by the number of players and the desired level of competition. A player may only exchange one playing card 12 at a time for its corresponding playing piece 5, 10 and 11. If a player cannot make use of a playing card 12 that the player has in his/her possession, then the player must keep the playing card 12 in his/her possession. A playing piece 5, 10 and 11 may be placed on the playing surface 1 only on the proper space for that type of playing piece 5, 10 and 11. For example, a corner playing piece 5 may be placed only on a corner space 2; a border playing piece 10 may only be placed on a border space 3; and an interior playing piece 11 may only be placed on an interior space 4.

Only interior playing pieces 11 and border playing pieces 10 can be placed on the first move of the game. After the first playing piece 11 or 10 is placed on the playing surface 1, all subsequent playing pieces 5, 10 or 11 must connect to a playing piece 5, 10 and 11 that has already been placed on the playing surface 1. The exterior edges 6 of a border playing piece 10 or corner playing piece 5 indicate proper orientation on the outer perimeter of the playing surface 1. A playing card 12 can not be reused in the same game after a player exchanges the playing card 12 for its corresponding playing piece 5, 10 and 11.

Generally, there are four types of games that may be played, depending on the number of players and desired level of competition: Individual Game With No Sets, Individual Game With Sets, Cooperative Game With No Sets, Cooperative Game With Sets, Competitive Game With No Sets, and Competitive Game With Sets. Table 1 determines the type of game to be played depending on the number of players and desired level of competition.

TABLE 1

|  | One Person Wins | Group Wins |
| --- | --- | --- |
| Game With Sets | Competitive Game With Sets Individual Game With Sets | Cooperative Game With Sets |
| Game With No Sets | Individual Game With No Sets Competitive Game With No Sets | Cooperative Game, With No Sets |

* A person can win for himself/herself or for a team.

In addition to the rules in the exemplary embodiments of game play, any method of game play may be played without a game board, without playing cards, and/or with a timer.

Individual Game With No Sets

In one exemplary embodiment, an individual game with no sets for connecting all the playing pieces 5, 10 and 11, is provided. The player wins if the player can connect all of the playing pieces 5, 10 and 11. The player loses if the player is unable to connect all of the playing pieces 5, 10 and 11.

Rules: Before beginning the game, all playing pieces 5, 10 and 11 are separated and organized by type (e.g., corner, border, or interior). The playing cards 12 are shuffled, and placed in a stack, facing down. In a game with no sets, the player picks a playing card 12 from the top of the stack, and exchanges the playing card 12 for the corresponding playing piece 5, 10 and 11. If the player cannot make use of a playing card 12, the player must keep the playing card 12 in his/her possession and continue selecting additional playing cards 12 until the player selects a playing card 12 that can be exchanged for a playing piece that can be placed on the playing surface 1. The player must use a playing card 12 in the player's possession before picking another playing card 12 if possible.

Individual Game With Sets

In one exemplary embodiment, an individual game with sets for connecting all the playing pieces 5, 10 and 11, is provided. The player wins if the player can connect all of the playing pieces 5, 10 and 11. The player loses if the player is unable to connect all of the playing pieces 5, 10 and 11.

Rules: Before beginning the game, all playing pieces 5, 10 and 11 are separated and organized by type (e.g., corner, border, or interior). The playing cards 12 are shuffled, and placed in a stack, facing down.

In a game with sets, the player gets an equal amount of playing cards 12 during each set. Any unused playing cards 12 are retained by the player for use in the following set, in addition to the playing cards 12 that are dealt during each consecutive set.

Cooperative Game With No Sets

In another exemplary embodiment, a cooperative game with no sets for connecting all of the playing pieces 5, 10 and 11 is provided. All players win if they connect all of the playing pieces 5, 10 and 11 on the playing surface 1. All players lose if the players are unable to connect all the playing pieces 5, 10 and 11 on the playing surface 1. Any number of players from two to eight can play.

Rules: Before beginning the game, all playing pieces 5, 10 and 11 are separated and organized by type (e.g., corner, border, or interior). The playing cards 12 are shuffled, and placed in a stack, facing down. The players alternate turns in the game with two players. The player with possession of a turn rotates clockwise in the game with more than two players. Each player selects one playing card 12 from the top of the stack on his/her turn. The players may not share information about their playing cards 12. If a player cannot make use of a playing card 12, then the player looses his/her turn and must retain the playing card 12, but during the player's subsequent turn, the player must play any playing card 12 in the player's possession before picking another playing card 12 if possible.

Cooperative Game With Sets

In another exemplary embodiment, a cooperative game with sets for connecting all of the playing pieces 5, 10 and 11 as a group is provided. A set begins when each player receives eight playing cards 12. All players win the game as a group if they connect all the playing pieces 5, 10 and 11. All players lose if they cannot connect all of the playing pieces 5, 10 and 11.

Rules for a cooperative game with sets with two players: Before beginning the game, all playing pieces 5, 10 and 11 are separated and organized by type (e.g., corner, border, or interior). The playing cards 12 are shuffled, and placed in a stack, facing down. The player with possession of a turn first must alternate between players at the beginning of each set. The game is played with four sets. Each player is dealt eight playing cards 12 per set.

At the beginning of the set, eight playing cards 12 are dealt to each player. The players may not share information about their playing cards 12. Turns are mandatory, but if a player cannot place any of his/her playing pieces 5, 10 and 11 on the playing surface 1, then the player must forfeit his/her turn. Once a turn has been forfeited, it can not be recovered. Each player is limited to eight turns in each set, except the last set, which continues until the game is concluded. Any unused playing card 12 is retained by the player for use in the following set, in addition to the playing cards 12 distributed during the following set.

Rules for a cooperative game with sets with four players: Before beginning the game, all playing pieces 5, 10 and 11 are separated and organized by type (e.g., corner, border, or interior). The playing cards 12 are shuffled, and placed in a stack, facing down. The game is played with two sets. Each player is dealt eight playing cards 12 per set. Players choose which player will have a turn first. The player with a turn first on the first set should have a turn first on the second set also. Possession of the turn should rotate left (clockwise). At the beginning of the set, the playing cards 12 are dealt. Players can not share information about their playing cards 12. Turns are mandatory, but if the player cannot place any of his/her playing pieces 5, 10 and 11 on the playing surface 1, then the player must forfeit his/her turn. Once a turn has been forfeited, it may not be recovered. Each player is limited to eight turns in each set except the last set, which continues until the game is concluded. Any unused playing cards 12 are retained by the player for use in the following set, in addition to the playing cards 12 distributed during the following set.

Competitive Game (With Sets; With No Sets)

In another exemplary embodiment, a competitive game is provided. The game is won by the first player to connect all the playing pieces 5, 10 and 11 corresponding to all of his/her playing cards 12, or the first team in which a player connects all of the playing pieces 5, 10 and 11 corresponding to all his/her playing cards 12. The game can be divided into sets. A set begins when each player is dealt eight playing cards 12. A point value is assigned to each type of playing piece 5, 10 and 11 (or playing card 12), with corner playing pieces 5 having the highest point value, border playing pieces 10 having the second highest point value, and interior playing pieces 11 having the lowest point value. At the beginning of the set, the playing cards 12 are dealt to each player. The first player to connect all of the playing pieces 5, 10 and 11 corresponding to his/her playing cards 12 wins the game for himself/herself or for his/her team. If neither player or team places all of their playing pieces 5, 10 and 11 by the end of the last set, then the player or team with the lowest accumulated total number of points wins the game.

Rules for the competitive game with two players: Before beginning the game, all playing pieces 5, 10 and 11 are separated and organized by type (e.g., corner, border, or interior). The playing cards 12 are shuffled, and placed in a stack, facing down. Players choose which player will have a turn first. In a game with sets, the player with possession of a turn first must alternate between players at the beginning of each set. In a game with sets, the game is played with four sets. Each player is dealt eight playing cards 12 per set. In a game with no sets, each player receives a playing card 12 when it is his/her turn. The players can not share information about their playing cards 12. Turns are mandatory, but if a player cannot place any of his/her playing cards 12 then the player must forfeit his/her turn. Once a turn has been forfeited, it can not be recovered. In a game with sets, each player is limited to eight turns in each set except the last set, which continues until the game is concluded. In a game with sets, any unused playing card 12 is retained by the player for use in the following set, in addition to the playing cards 12 distributed during the following set. Any playing cards 12 remaining in a player's possession are kept by that player until the end of the game.

Rules for the competitive game with four players playing individually or in teams: Before beginning the game, all playing pieces 5, 10 and 11 are separated and organized by type (e.g., corner, border, or interior). The playing cards 12 are shuffled, and placed in a stack, facing down. Players choose which player will have a turn first. In a game with sets, the player with a turn first on the first set should have a turn first on the second set also. Possession of the turn should rotate clockwise among the players. The game with sets is played with two sets. Each player is dealt eight playing cards 12 per set. In a game with no sets, each player receives a playing card 12 when it is his/her turn. The players can not share information about their playing cards 12. Turns are mandatory, but if a player cannot place any of his/her playing cards 12 on the playing surface 1, then the player must forfeit his/her turn. Once a turn has been forfeited, it can not be recovered. In a game with sets, each player is limited to eight turns per set except the last set, which continues until the game is concluded. In a game with sets, any unused playing card 12 is retained by the player for use in the following set, in addition to the playing cards 12 dealt during the following set. Any playing card 12 remaining in a player's possession are kept by that player until the end of the game.

Strategy Game with only Playing Cards

In another embodiment, a strategy game with only playing cards is provided. The game can be played individually or competitively with two or more players. The game can be played with or without the playing surface 1.

In one embodiment, the cards have to connect to another card except for the first card played. The player to play the first card in the game has the option to play a border card or an interior card. After the first player plays the first card, all subsequent cards must connect to any card previously played.

Rules of game play for strategy game with only playing cards on an 8×8 grid: In one embodiment, the game is played with all 64 playing cards. A total of 8 cards are placed on a row or column. There can only be 6 border cards consecutively on a row or a column. At each extreme side of 6 consecutive border cards in a row or a column there can only be a corner card, or, between two corner cards in opposite sides of a row or a column there can only be 6 border cards. There can only be 6 interior cards consecutively on a row or a column. At each extreme side of 6 consecutive interior cards in a row or a column there can only be a border card, or, between two border cards in opposite sides of a row or a column there can only be 6 interior cards. In the first turn a player can play a border card or interior card. After the first card is played all subsequent cards most connect to any card previously played.

Additional rules for strategy game with only playing cards on a 3×3 grid, 4×4 grid, 5×5 grid, 6×6 grid, or 7×7 grid: The corner playing cards have a higher ranking than the border playing cards; therefore, the border playing cards should connect to corner playing cards adjacent to them and not necessarily vice versa; and the border playing cards have a higher ranking than the interior playing cards; therefore, the interior playing cards should connect to border playing cards adjacent to them and not necessarily vice versa. Border playing cards should connect to other border playing cards adjacent to them. Interior playing cards should connect to other interior playing cards adjacent to them.

In another embodiment, a strategy game with only playing cards is provided. The game can be played individually or competitively with two or more players. The game can be played with or without the playing surface 1.

Rules for individual strategy game with only playing cards: The objective of the individual game is to place all of the interior playing cards 12 on the playing surface 1. The player begins the game with eight playing cards 12. At the beginning of the game, four border playing cards 12 should be placed on each of the four spaces designated for border playing cards 12. If the player does not have four border playing cards 12, the player must select additional playing cards 12 until the player possesses four border playing cards 12. The player can place four border playing cards 12 if the player has at least one interior playing card 12 that contains indicia of a connecting edge corresponding to the indicia of the connecting edge to the four border playing cards 12. If the player does not have an interior playing card 12 that contains indicia of a connecting edge corresponding to the indicia of the connecting edge of four border playing cards 12 in his possession, the player must obtain additional playing cards 12 until the player possesses an acceptable interior playing card 12. All interior playing cards 12 in a player's possession that can be played, must be played consecutively. Once a player does not have any remaining interior playing cards 12 that can be placed, the player must play a border playing card 12. The player must have at least one interior playing card 12 in his possession to play a border playing card 12. A player can play a border playing card 12 if it would allow the player to play an interior playing card 12 in his possession. A border playing card 12 can be placed on top of an already placed border playing card 12 if the interior facing edge of the border playing card 12 has the opposite connector as the already placed border playing card 12. Corner playing cards 12 in the player's possession must be played before any other playing card 12. After a corner playing card 12 is placed on the playing surface 1, only border playing cards 12 that contain indicia of a connecting edge corresponding to the indicia of a connecting edge of the corner playing cards 12 may be placed on the playing surface 1. A corner playing card 12 must be removed from the game when six interior playing cards 12 of the same type have been placed on the playing surface 1. Two border playing cards 12 with opposite interior facing edge connectors can be swapped with each other immediately after an interior playing card 12 having two pairs of different connectors has been played. A corner playing card 12 can be removed before swapping two cards.

Additional rules for competitive play: Every player receives eight playing cards 12. A border playing card 12 may only be placed on the playing surface if it contains an indicia of a connecting edge corresponding should connect to an indicia of a connecting edge of a corner playing card 12 that has been previously placed on the playing surface. An interior playing card 12 may only be placed on the playing surface if it contains an indicia of a connecting edge corresponding to the indicia of a connecting edge a border playing card 12 that has been previously placed on the playing surface. At the beginning of the game, four border playing cards 12 are placed on each of the four spaces designated for border playing cards 12. If a player does not possess a border playing card, the player can play a corner playing card 12. After a corner playing card 12 is placed on the playing surface 1, a border playing card 12 may only be played if it contains an acceptable indicia corresponding to the indicia on the corner playing cards that have already been played. If a player does not have a corner playing card 12 in his possession, the player looses his turn. After four border playing cards 12 have been played, an interior playing card that contains an acceptable indicia corresponding to the indicia on the four border playing cards. If a player does not possess an acceptable interior playing card 12, the player may play any border playing card 12 on any of the spaces designated for border playing cards 12. If a player does not possess a border playing card 12, the player may play a corner playing card 12. If a player does not possess a corner playing card 12, the player looses his turn. Game play should continue until one player plays all of his playing cards 12. In the exemplary embodiment, the objective of the game is to be the first player to play all his playing cards 12. If no players are able adjacent to play all of their playing cards 12, the player or team with the least accumulated playing cards wins the game. In another exemplary embodiment, the player with the turn preceding the player who played all of his playing cards 12 wins the game. If no players are able to play all of their playing cards 12, the player or team with the most accumulated playing cards wins the game.

Strategy Game with Playing Pieces on Board Prior to Play

In another exemplary embodiment, a game for connecting individually, cooperatively, or competitively all the playing pieces 5, 10 and 11 is provided when any amount of playing pieces 5, 10 and 11 are already on the playing surface 1 at the beginning of the game. When any amount of playing pieces 5, 10 and 11 are already on the playing surface 1 at the beginning of the game, the rules of play for each of the respective types of games remain the same as described above.

Strategy Game with the Option of Connecting Playing Pieces

In another exemplary embodiment, the game may start with or without any amount of playing pieces 5, 10 and 11 on the playing surface 1. At any point in the game, each player has the option of connecting or not connecting playing pieces 5, 10 and 11 to another playing piece 5, 10, and 11 that is already on the playing surface 1.

Storage Trays for Playing Pieces

Figure 8:
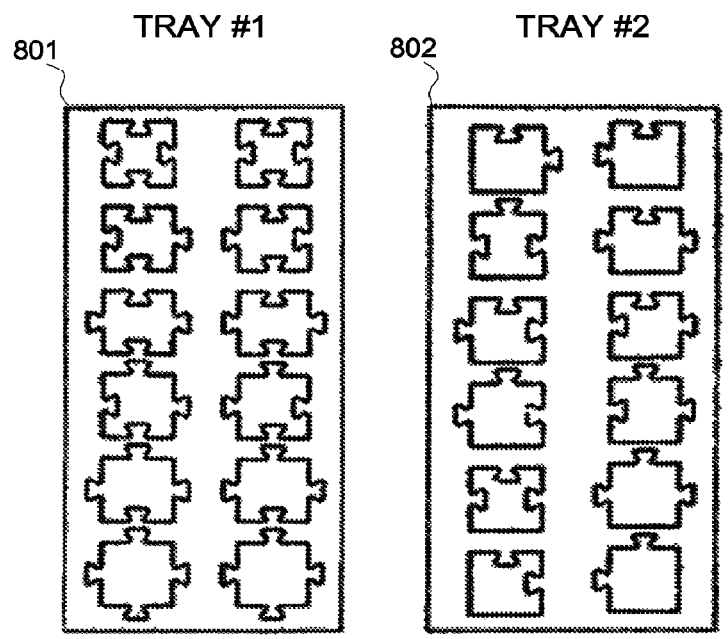
FIG. 8 illustrates a plan view of storage trays.
Figure 8:
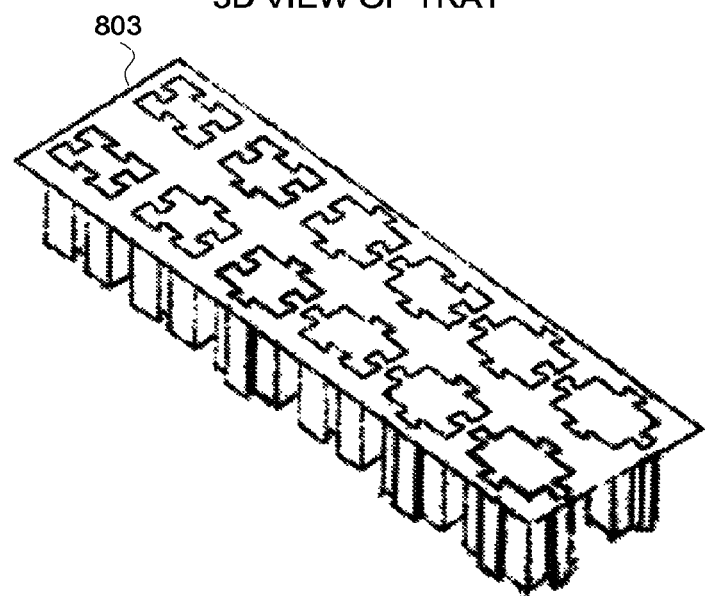

FIG. 8 illustrates a plan view of Trays #1 and #2. As shown in FIG. 8, Tray #1 includes 12 cavities for storing the playing pieces interior 11. Tray #2 similarly includes twelve cavities for storing the playing pieces corner 5 and border 10. FIG. 8 also shows a 3-dimensional view of Tray #1. The 12 different cavities in each storage tray correspond to the shape of each type of playing piece 5, 10, or 11 that fits in them. There are a total of 12 different types of shapes that form the cavities in each storage tray. Each cavity fir the playing pieces corner 5 stores one playing piece. Each cavity for the playing pieces border 10 and interior 11 stores three playing pieces. Each cavity of the trays is open at the top. The storage trays are meant to effectively store the playing pieces 5, 10 and 11, organize each playing piece 5, 10 and 11 by type to improve the strategy game playing process, and aid the players in knowing how many playing pieces 5, 10 and 11 of each type are left during a game.

Strategy Game Played on Paper

In another embodiment, a strategy game played on a drawing surface with only predefined drawings is provided. The game can be played individually or competitively with two or more players.

Figure 9:
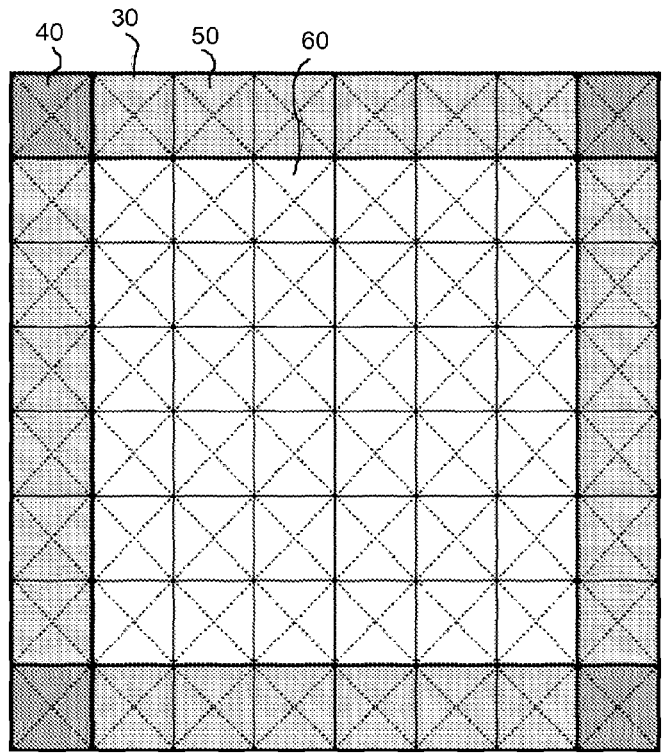
FIG. 9 illustrates a plan view of a drawing surface according to one embodiment of game play.
Figure 9:
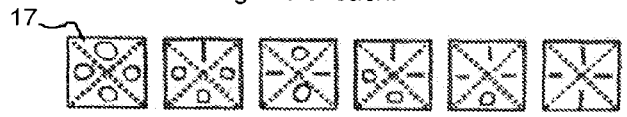
Figure 9:
Figure 9:

FIG. 9 illustrates a plan view of a drawing surface according to one embodiment of the invention. As shown in FIG. 9, the drawing surface 30 is a grid containing sixty-four square shaped spaces. In one embodiment, the drawing surface 30 contains different types of spaces. For example, playing surface 30 may include corner spaces 40, border spaces 50, and interior spaces 60. In this exemplary embodiment, there are four corner spaces 40, twenty-four border spaces 50, and thirty-six interior spaces 60.

Drawing surface 30 provides a surface on which a set of predefined drawings are drawn during game play. Any flat drawing surface and/or material can be used to form the drawing surface 30 by drawing or otherwise delineating the shaped spaces which form the surface.

Other shaped spaces which facilitate drawing of the predefined drawings on the drawing surface 30 can be used instead of square shaped spaces (e.g., triangular, rectangular, pentagonal, hexagonal, octagonal, etc.).

Each type of space on the drawing surface 30, corner space 40, border space 50, and interior space 60, contain different indicia, indicating correct drawing of a predefined drawing during game play.

FIG. 9 also provides a set of predefined drawings illustrating the drawings interior 17, the drawings border 18, and the drawings corner 19 according to one exemplary embodiment. As shown in FIG. 9, each drawings interior 17, drawings border 18, and drawings corner 19 contain four sides 20. Each side 20 is an exterior side or a connecting side. The exterior side has no connector 21. The connecting side can be either a male connector 22 or a female connector 23. The male connector 22 is a line drawing on a side 20. The female connector 23 is a circle drawing on a side 20. Alternatively, each side 20 may have a combination of both male and female connectors. A male connector 22 and a female connector 23 can be of any shape or design that matches the side 20 of one predefined drawing 17, 18, and 19 with the corresponding side 20 of another predefined drawing 17, 18, and 19. In another embodiment, the connecting side 20 can be a side 20 matching system. The side matching system is an indicia drawn, etched, or otherwise printed on the surface of the side 20 of the predefined drawing 17, 18, and 19. In one embodiment, the indicia is a color. In another embodiment, the indicia is a design.

Two adjacent sides 20 of the drawings corner 19 contain a connecting side, and two adjacent sides 20 are exterior sides. In the exemplary embodiment, there are four different combinations of connecting sides and exterior sides 20 for the drawings corner 19.

Three adjacent sides 20 of the drawings border 18 contain a connecting side, and one side 20 is an exterior sides. In the exemplary embodiment, there are eight different combinations of connecting sides and exterior sides 20 for the drawings border 18. There are three duplicates of each of the eight different drawings border 18.

Four sides 20 of the drawings interior 17 contain a connecting side. In the exemplary embodiment, there are six different combinations of connecting sides 20 for the drawings interior 17. There are six duplicates of each of the six different drawings interior 17.

Rules for strategy game with only drawing surface and predefined drawings: The objective of the game is to complete the grid on the drawing surface 30 with a set of predefined drawings 17, 18, and 19. Each section of the drawing surface 30 is divided into subsections to facilitate the process of drawing the predefined drawings 17, 18, and 19 on them. In one exemplary embodiment, a game may start with any quantity of predefined drawings 17, 18, and 19 already drawn on the drawing surface 30. In another exemplary embodiment, a game may start with no predefined drawings 17, 18, and 19 already drawn on the drawing surface 30. The player has the option of connecting or not connecting the predefined drawings 17, 18, and 19 to other predefined drawings 17, 18, and 19 already drawn on the drawing surface 30. Only opposite connectors of different predefined drawings 17, 18, and 19 may be adjacent on the drawing surface 30. Drawings interior 17 can be drawn on the drawing surface 30 in any possible orientation.

Exemplary Computer Readable Medium Implementation

The example embodiments described above, or any part(s) or function(s) thereof, may be implemented by using hardware, software or a combination thereof and may be implemented in one or more computers or other processing systems. The operations may be completely implemented with machine operations. Useful machines for performing the operation of the example embodiments presented herein include general purpose digital computers or similar devices.

The computer 700 preferably includes without limitation a processor device 710, a main memory 725, and an interconnect bus 705. The processor device 710 may include without limitation a single microprocessor, or may include a plurality of microprocessors for configuring the computer 700 as a multi-processor system. The main memory 725 stores, among other things, instructions and/or data for execution by the processor device 710. If the system is partially implemented in software, the main memory 725 stores the executable code when in operation. The main memory 725 may include banks of dynamic random access memory (DRAM), as well as cache memory.

The computer 700 may further include a mass storage device 730, peripheral device(s) 740, portable storage medium device(s) 750, input control device(s) 780, a graphics subsystem 760, and/or an output display 770. For explanatory purposes, all components in the computer 700 are shown in FIG. 7 as being coupled via the bus 705. However, the computer 700 is not so limited. Devices of the computer 700 may be coupled through one or more data transport means. For example, the processor device 710 and/or the main memory 725 may be coupled via a local microprocessor bus. The mass storage device 730, peripheral device(s) 740, portable storage medium device(s) 750, and/or graphics subsystem 760 may be coupled via one or more input/output (I/O) buses. The mass storage device 730 is preferably a nonvolatile storage device for storing data and/or instructions for use by the processor device 710. The mass storage device 730 may be implemented, for example, with a magnetic disk drive or an optical disk drive. In a software embodiment, the mass storage device 730 is preferably configured for loading contents of the mass storage device 730 into the main memory 725.

The portable storage medium device 750 operates in conjunction with a nonvolatile portable storage medium, such as, for example, a compact disc read only memory (CD-ROM), to input and output data and code to and from the computer 700. In some embodiments, the software for storing an internal identifier in metadata may be stored on a portable storage medium, and may be inputted into the computer 700 via the portable storage medium device 750. The peripheral device(s) 740 may include any type of computer support device, such as, for example, an input/output (I/O) interface configured to add additional functionality to the computer 700. For example, the peripheral device(s) 740 may include a network interface card for interfacing the computer 700 with a network 720.

The input control device(s) 780 provide a portion of the user interface for a user of the computer 700. The input control device(s) 780 may include a keypad and/or a cursor control device. The keypad may be configured for inputting alphanumeric and/or other key information. The cursor control device may include, for example, a mouse, a trackball, a stylus, and/or cursor direction keys. In order to display textual and graphical information, the computer 700 preferably includes the graphics subsystem 760 and the output display 770. The output display 770 may include a cathode ray tube (CRT) display and/or a liquid crystal display (LCD). The graphics subsystem 760 receives textual and graphical information, and processes the information for output to the output display 770.

Each component of the computer 700 may represent a broad category of a computer component of a general and/or special purpose computer. Components of the computer 700 are not limited to the specific implementations provided here.

Portions of the invention may be conveniently implemented by using a conventional general purpose computer, a specialized digital computer and/or a microprocessor programmed according to the teachings of the present disclosure, as will be apparent to those skilled in the computer art. Appropriate software coding may readily be prepared by skilled programmers based on the teachings of the present disclosure.

Some embodiments may also be implemented by the preparation of application-specific integrated circuits, field programmable gate arrays, or by interconnecting an appropriate network of conventional component circuits.

Some embodiments include a computer program product. The computer program product may be a storage medium or media having instructions stored thereon or therein which can be used to control, or cause, a computer to perform any of the processes of the invention. The storage medium may include without limitation a floppy disk, a mini disk, an optical disc, a Blu-ray Disc, a DVD, a CD-ROM, a micro-drive, a magneto-optical disk, a ROM, a RAM, an EPROM, an EEPROM, a DRAM, a VRAM, a flash memory, a flash card, a magnetic card, an optical card, nanosystems, a molecular memory integrated circuit, a RAID, remote data storage/archive/warehousing, and/or any other type of device suitable for storing instructions and/or data.

Stored on any one of the computer readable medium or media, some implementations include software for controlling both the hardware of the general and/or special computer or microprocessor, and for enabling the computer or microprocessor to interact with a human user or other mechanism utilizing the results of the invention. Such software may include without limitation device drivers, operating systems, and user applications. Ultimately, such computer readable media further includes software for performing aspects of the invention, as described above.

Included in the programming and/or software of the general and/or special purpose computer or microprocessor are software modules for implementing the processes described above.

While various example embodiments of the present invention have been described above, it should be understood that they have been presented by way of example, and not limitation. It will be apparent to persons skilled in the relevant arts) that various changes in form and detail can be made therein. Thus, the present invention should not be limited by any of the above described example embodiments, but should be defined only in accordance with the following claims and their equivalents.

In addition, it should be understood that the figures are presented for example purposes only. The architecture of the example embodiments presented herein is sufficiently flexible and configurable, such that it may be utilized and navigated in ways other than that shown in the accompanying figures.

Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

What is claimed is:

1. A game set for playing a strategy game on a playing surface by one or more persons, the game set comprising:
   a plurality of playing pieces, each playing piece having a predetermined number of edges, wherein each edge is at least one of an exterior edge and a connecting edge, wherein the plurality of playing pieces include a plurality of corner playing pieces, a plurality of border playing pieces, and at least one interior playing piece;
   a plurality of playing cards, each playing card containing an indicia corresponding to a shape of one of the plurality of playing pieces;
   a playing surface; and
   a storage tray configured to store the plurality of playing pieces,
   wherein the storage tray includes cavities shaped differently to correspond to the plurality corner playing pieces, the plurality of border playing pieces, and the at least one interior playing piece,
   wherein at least one of the cavities is configured to receive therein multiple pieces of the plurality of playing pieces.

2. The game set according to claim 1, wherein each of the plurality of playing pieces is selected from the group consisting of a playing piece having three edges, a playing piece having four edges, a playing piece having five edges, and a playing piece having six edges.

3. The game set according to claim 1, wherein each of the plurality of corner playing pieces has two adjacent exterior edges.

4. The game set according to claim 1, wherein each of the plurality of border playing pieces has one exterior edge.

5. The game set according to claim 1, wherein each interior playing piece has no exterior edges.

6. The game set according to claim 1, wherein each connecting edge is selected from the group consisting of an edge with an interlocking design, a straight edge marked with an indicia, a straight edge marked with a color, and a straight edge marked with a number.

7. The game set according to claim 1, wherein the playing surface is a grid having a plurality of spaces corresponding to the plurality of playing pieces.

8. The game set according to claim 1, wherein each player is dealt an equal amount of playing cards to begin each of a plurality of sets, and wherein an amount of turns for each player in each set is limited to a predetermined number.

9. The game set according to claim 1, wherein one or more playing pieces are already on the playing surface at a beginning of a game.

10. The game set according to claim 1, wherein the playing surface is a grid having a predetermined number of rows and columns.

\* \* \* \* \*